United States Patent [19]

Hecker

[11] Patent Number: 4,783,584
[45] Date of Patent: Nov. 8, 1988

[54] APPARATUS FOR IMPROVING VISION SYSTEMS IN MANUFACTURING ENVIRONMENTS

[75] Inventor: Joel Hecker, Port Jefferson Station, N.Y.

[73] Assignee: Robotic Vision Systems, Inc., Hauppauge, N.Y.

[21] Appl. No.: 656,870

[22] Filed: Oct. 2, 1984

[51] Int. Cl.⁴ .............................................. B23K 9/32
[52] U.S. Cl. ................................ 219/130.01; 219/136
[58] Field of Search ................ 219/74, 124.34, 130.01, 219/130.21, 136, 147

[56] References Cited

U.S. PATENT DOCUMENTS

| | | | |
|---|---|---|---|
| 1,552,369 | 9/1925 | White | 219/74 |
| 1,749,765 | 3/1930 | Hendrickson | 219/74 |
| 2,410,306 | 10/1946 | Romberg | 219/147 |

FOREIGN PATENT DOCUMENTS

| | | | |
|---|---|---|---|
| 145072 | 11/1980 | German Democratic Rep. | 219/124.34 |
| 616076 | 7/1978 | U.S.S.R. | 219/124.34 |

Primary Examiner—Clifford C. Shaw
Attorney, Agent, or Firm—Max Fogiel

[57] ABSTRACT

An arrangement in robot-controlled systems using vision devices for sensing visual or optical characteristics of predetermined parameters associated with the robot-controlled system or the process carried out by the system. A flexible barrier is placed between the vision device and visually interfering effects resulting from the robot-controlled process, such as bright light of a welding arc, or particles such as smoke or machining chips. The flexible barrier provides an economical solution for accommodating complex shapes and imprecise positioning.

3 Claims, 2 Drawing Sheets

APPARATUS FOR IMPROVING VISION SYSTEMS IN MANUFACTURING ENVIRONMENTS

BACKGROUND OF THE INVENTION

The present invention relates to a device for improving the performance and thereby increasing the applicability of single pass, vision guided, robot-controlled welding systems. The device can also improve vision system performance in other manufacturing environments.

Present robot-controlled welding systems require stringent robot and workpiece position accuracies for acceptable weld seams. Vision systems have been added to these robots which can locate the seams in three dimensional space and correct the robot position to achieve the desired position and orientation of the robot-mounted weld torch with respect to the workpiece seam. This reduces the workpiece and robot position accuracy requirements. Two alternative welding schemes are possible. They are two pass and single pass welding.

Two pass welding separates the operation into two passes along the weld seam. During the first pass the robot moves along the weld seam allowing the vision system to view the seam and generate the seam location in three dimensional space. This seam location information is used to modify the robot path during a second pass, when the welding is done, so that the weld tip is positioned as desired with respect to the seam. This method requires two passes along the seam, thereby increasing the cycle time.

Single pass welding systems combine the vision and welding operation into one pass along the weld seam. The vision system looks at the same time welding occurs and continuously updates the robot to achieve the desired weld tip location and orientation with respect to the seam. The vision system looks slightly in front of the weld area to determine seam position prior to the weld tip reaching the viewed seam location.

There are several significant problems associated with single pass welding which interfere with the vision system including direct arc glare, reflected arc glare, weld spatter and weld fumes. These items are seen by the vision system and can prevent seam data from being generated or cause the vision system to generate wrong data. Extensive hardware and/or software processing of this vision data is required to locate the seam in the presence of these interfering factors during single pass welding.

SUMMARY OF THE INVENTION

It is an object of the present invention to eliminate or minimize the welding problems indicated previously by preventing the vision system from seeing the direct and indirect arc glare, weld spatter and weld fumes.

The object is achieved by using a flexible barrier between the weld location and vision location. This barrier may be configured to follow the surface contour and irregularities in the vicinity of the weld, shielding the vision system from the weld generated interfering factors. Similarly, the barrier may be used to prevent any environmental contaminant from obscuring the surface that a vision system is required to observe.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
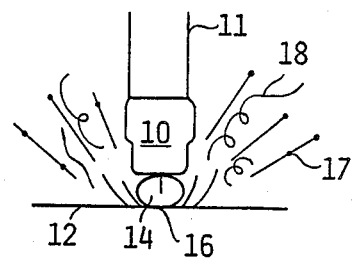
FIG. 1 is a schematic view and shows those factors present during welding which interface with the vision system, according to the present invention.

Referring to the drawings, a typical weld tip 10 on a weld head 11 during the weld operation is shown in FIG. 1. Molten metal 14 is transferred from the weld tip to the workpiece surface 12 during the welding operation. This results in a bright arc 16 in the vicinity of the weld. Radiant energy from the arc may be seen directly by the vision system or may be reflected by the workpiece or the support structures into the vision system. This radiant light energy will compete with the light energy used for vision.

Weld spatter 17 consists of metal particles which are projected radially from the weld location. They may be red hot, emitting light energy which interferes with the vision system or the metal particles may physically block the light energy used for vision. Weld fumes 18 generated by the heat of the weld may also block the light energy used for vision.

Figure 2:
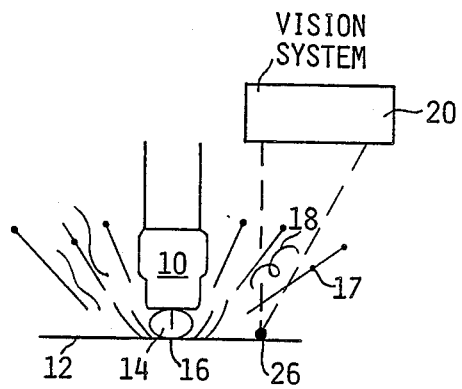
FIG. 2 is a schematic view and shows the position of the vision system with respect to the weld tip.

Any or all of these three interfering factors may be present during the various weld techniques available. FIG. 2 shows a typical location for the vision system 20 with respect to the weld point. The weld spatter paths 17 are shown as they cross the vision volume. When the vision system sees the red hot spatter or the direct or indirect arc glare special processing either in hardware or software must be used to detect the desired vision data in the presence of these interfering factors. Typically, methods such as pulse width discrimination, data connectivity, frame to-frame correlation, a priori knowledge or other methods are used to distinguish between wanted and unwanted vision information. Interfering vision data which is similar to or physically near the desired data is difficult if not impossible to remove. This data can distort the desired data or may result in incorrect vision data. Metal particles which do not radiate energy within the vision system bandwidth, may physically block the desired data resulting in missing and incomplete vision data.

Figure 3:
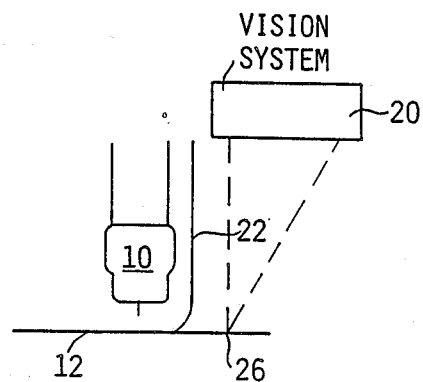
FIG. 3 is a schematic view and shows the placement of the flexible barrier with respect to the weld tip and vision system.
Figure 4:
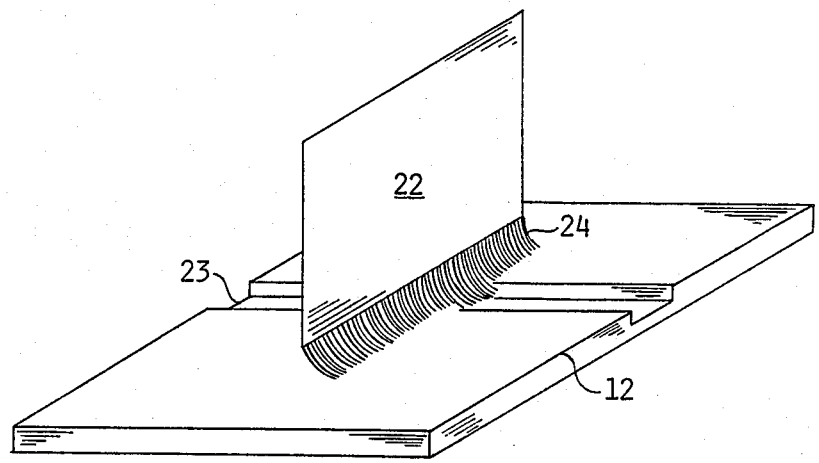
FIG. 4 is a perspective view and shows the adaptability of the flexible barrier to the workpiece features.

The method shown in FIG. 3 eliminates or greatly reduces the mentioned problems. The flexible barrier 22 is physically located between the vision center 26 and the weld point. In a preferred embodiment, the lower portion of the barrier consists of a flexible hairlike material 24 which can change shape to fill voids in the workpiece. The hairlike nature of the flexible barrier allows filling the weld seam 23 as well as following the contours of the surface as shown in FIG. 4. This efficiently blocks direct or indirect arc glare, weld spatter or smoke from reaching the vision system 20.

The hairlike section 24 at the bottom of the barrier can be easily replaced to allow periodic replacement as it wears or become damaged or to change the hairlike section for one more suited to a particular workpiece or weld technique.

Figure 5:
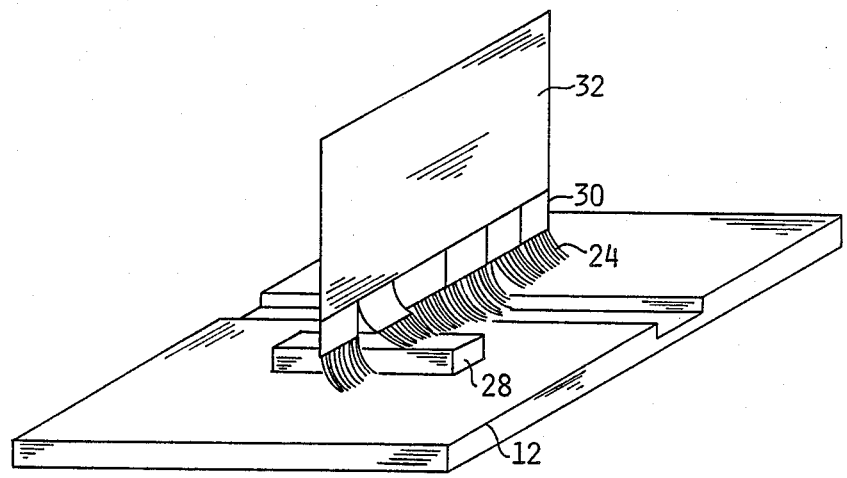
FIG. 5 is a perspective view and shows a flexible barrier with conforming sections to adapt to surface irregularities.

For applications where there are bumps 28 or irregularities an adaptive flexible barrier as shown in FIG. 5 may be used. Here there is a sectioned conforming barrier 30 located between the hairlike 24 and rigid portions 32 of the barrier. This conforming section is made of a flexible material that allows the barrier to pass over bumps or protrusions in the workpiece 12 while maintaining the desired performance.

Figure 6:
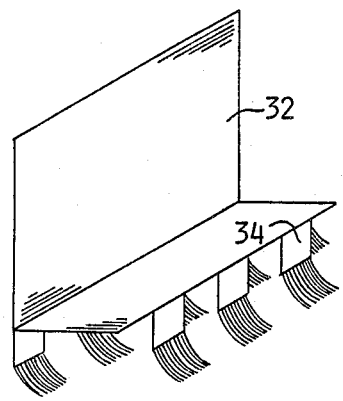
FIG. 6 shows an alternate flexible barrier configuration which allows air flow.

For applications where air flow around the weld is required and the previously described barriers would limit the flow, an arrangement shown in FIG. 6 could be used. The hairlike structure is divided into two or more sections 34 allowing more air flow but maintaining the required blocking characteristics.

Because of the nature of the mechanical structures associated with robotic welding it is possible that even with the described barriers some interference will still be seen by the vision system. The frequency of occurrence however will be greatly reduced from present systems. When this interference occurs simplified versions of the processing techniques mentioned previously can be used to separate vision data from interference or the data ignored. Since many views of the seam are taken, losing an occasional data point should not degrade system operation.

The use of a barrier may be extended to examine weld seams during the weld operation or to shield a vision system during a procedure which generates interference with vision, such as vision guided routing or finishing operations. For some applications, a solid flexible material may be preferred to using a hairlike material.

In general, if the interference of a hostile environment can be blocked by a barrier, then a barrier provides a simple means of improving vision system performance. Rigid barriers may be used in fixed installations and in precision motion applications. However, flexible barriers provide the most economical solution when complex shapes and/or imprecise motion between the observed surface ad the vision system is involved.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. An arrangement for reducing light, particle and moving material interference with vision systems used in automated material processing where said interference is generated by said material processing, comprising: material processing means producing light and moving materials within an environment contaminated by said moving materials; vision means for sensing predetermined visual characteristics of the material processing, sectioned flexible barriers arranged in at least two rows; openings between said sections for improved air flow; said openings being staggered to block linear light paths between the material processing means and the vision means.

2. An arrangement as defined in claim 1, wherein at least a part of said flexible barriers comprises hairlike material.

3. An arrangement for reducing light, particle and moving material interference with vision systems used in automated material processing where said interference is generated by said material processing, comprising: a weld head wth a weld tip; molten metal being transferred from said weld tip to a workpiece surface during a welding operation resulting in a substantially bright arc in vicinity of a weld; flexible barrier means located between a vision center and a weld point, said barrier means having a lower portion comprised of substantially flexible hairlike material which can change shape to all voids in the workpiece, said hairlike material of said barrier means filling the weld seam as well as following contours of the workpiece surface for blocking direct and indirect arc glare, weld spatter, and smoke from reaching the vision system; said hairlike material at the bottom of said barrier means comprised of replaceable sections; said hairlike sections comprising a first row of sections having spaces between adjacent sections; and at least a second row of hairlike sections with spaces between adjacent sections, said sections of said second row being superposed on spaces of said first row and spaces of said second row being superposed on hairlike sections of said first row, said second row being spaced from said first row for allowing air flow between said spaces and said rows.

* * * * *

UNITED STATES PATENT AND TRADEMARK OFFICE
CERTIFICATE OF CORRECTION

PATENT NO. : 4,783,584

DATED : November 8, 1988

INVENTOR(S) : Joel Hecker

It is certified that error appears in the above-identified patent and that said Letters Patent is hereby corrected as shown below:

Claim 3, line 5 (column 4, line 29); change "wth" to --with--.

Claim 3, line 12 (column 4, line 36): change "all" to --fill--.

Signed and Sealed this

Eleventh Day of June, 1991

Attest:

HARRY F. MANBECK, JR.

Attesting Officer

Commissioner of Patents and Trademarks